United States Patent
Yoshioka et al.

(10) Patent No.: US 6,940,684 B2
(45) Date of Patent: Sep. 6, 2005

(54) DISK DEVICE AND SEEK CONTROL METHOD

(75) Inventors: Masaki Yoshioka, Odawara (JP); Kenichi Masuda, Odawara (JP); Yuji Hata, Odawara (JP); Takeshi Nakazawa, Odawara (JP); Takayuki Umemoto, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 191 days.

(21) Appl. No.: 10/370,579

(22) Filed: Feb. 24, 2003

(65) Prior Publication Data

US 2003/0193855 A1 Oct. 16, 2003

(30) Foreign Application Priority Data

Apr. 11, 2002 (JP) ........................................ 2002-108670

(51) Int. Cl.[7] .............................................. G11B 5/596
(52) U.S. Cl. ................. 360/78.06; 360/78.07; 360/75
(58) Field of Search .............................. 360/31, 53, 75, 360/77.02, 77.04, 78.04–78.14, 78.09, 78.11, 78.06, 78.07

(56) References Cited

U.S. PATENT DOCUMENTS

| 5,268,884 | A | * | 12/1993 | Kiuchi et al. ............ 360/78.04 |
| 5,796,546 | A |   | 8/1998  | Sasamoto et al. |
| 5,870,241 | A | * | 2/1999  | Ottesen et al. ........... 360/77.02 |
| 6,339,811 | B1 | * | 1/2002 | Gaertner et al. ............ 711/112 |

FOREIGN PATENT DOCUMENTS

JP      A-7-320216      12/1995

* cited by examiner

*Primary Examiner*—David Hudspeth
*Assistant Examiner*—Jason Olson
(74) *Attorney, Agent, or Firm*—Antonelli, Terry, Stout & Kraus, LLP

(57) ABSTRACT

When a head passes over a track with a projected item in a seek operation, the CPU delays a seek start time to conduct the seek by changing a period of time from a seek start position to a position of the track with a projected item. Or, the CPU conducts seek control by changing a speed table. Or, the CPU changes a sequence of items of a tag queue to obtain a seek locus not passing the projected item. By the control operation, a seek error due to thermal asperity is prevented and the head is not damaged. This also prevents appearance of a new projected item produced by contact between the magneto-resistive head and the projected item on the recording medium.

12 Claims, 6 Drawing Sheets

DISK DEVICE AND SEEK CONTROL METHOD

BACKGROUND OF THE INVENTION

The present invention relates to a technique for preventing a seek error of a head for a disk device including a recording medium, the seek error occurring when the head is brought into contact with a projected item existing between the head and the recording medium. The present invention also relates to a technique to prevent damage of the head due to the contact and a technique of seek control to prevent occurrence of another failure due to contact between the head and the recording medium.

A magneto-resistive (MR) head reproduces magnetic data recorded on a magnetic recording medium. In the data reproduction, by feeding a detection current to a magneto-resistive-effect element, a change in a leakage magnetic field of the medium is detected as a change of electric resistance (a voltage change). Use of an MR head is accompanied by a problem of contact between the MR head and a projected item existing between the head and the magnetic recording medium.

When the magneto-resistive-effect element of the MR head is brought into contact with the projected item, temperature of the element instantaneously increases. The temperature increase changes a resistance value of the element or the voltage change described above. This is called "thermal asperity (TA)". When thermal asperity occurs during the reproduction of magnetic data recorded on a magnetic recording medium, the data cannot be correctly reproduced.

To cope with thermal asperity, a sector on which the thermal asperity has occurred is replaced with another sector or a track including the sector is replaced (JP-A-7-320216).

According to the invention described in JP-A-7-320216, the sector and the track associated with the thermal asperity are not used. Therefore, this invention is efficient to prevent errors during the data recording and reproducing operations. However, there further remain problems as follows. In seek control, a seek error occurs when the MR head passes over a track on which a projected item exists. When the head collides with the projected item, the head is damaged. The collision enlarges the projected item and hence thermal asperity occurs.

SUMMARY OF THE INVENTION

According to the present invention, seek control is performed to avoid contact between the MR head and the projected item existing between the head and the recording medium. By conducting the seek operation as above, thermal asperity is prevented. The seek error occurring when the head passes over a track on which a projected item exists can be prevented. The head damage caused when the head collides with the projected item can be prevented. Additionally, occurrence of thermal asperity due to a new projected item appearing as a result of the contact between the head and the projected item can be prevented.

According to the present invention, there is provided a disk device specifically configured and controlled as follows. The disk device includes a data recording medium on which data is recorded, a head to read data recorded in a sector on the medium, a central processing unit (CPU) to move the head to a position over a target sector of the medium, and a memory to which a position of a sector of the medium including a defect is registered. A seek span is calculated using a current track position of the head and a position of a track including the target sector. A check is made to detect whether or not the seek span covers a track including a sector having a projected item. If such a sector exists in the seek span, a period of time A required to move the head to the track of the sector and a period of time N required for the sector having the projected item to reach a position over a seek locus are calculated. If the time A is equal to the time N, seek control is performed to conduct a particular seek.

Other objects, features and advantages of the invention will become apparent from the following description of the embodiments of the invention taken in conjunction with the accompanying drawings.

DESCRIPTION OF THE EMBODIMENTS

Figure 1:
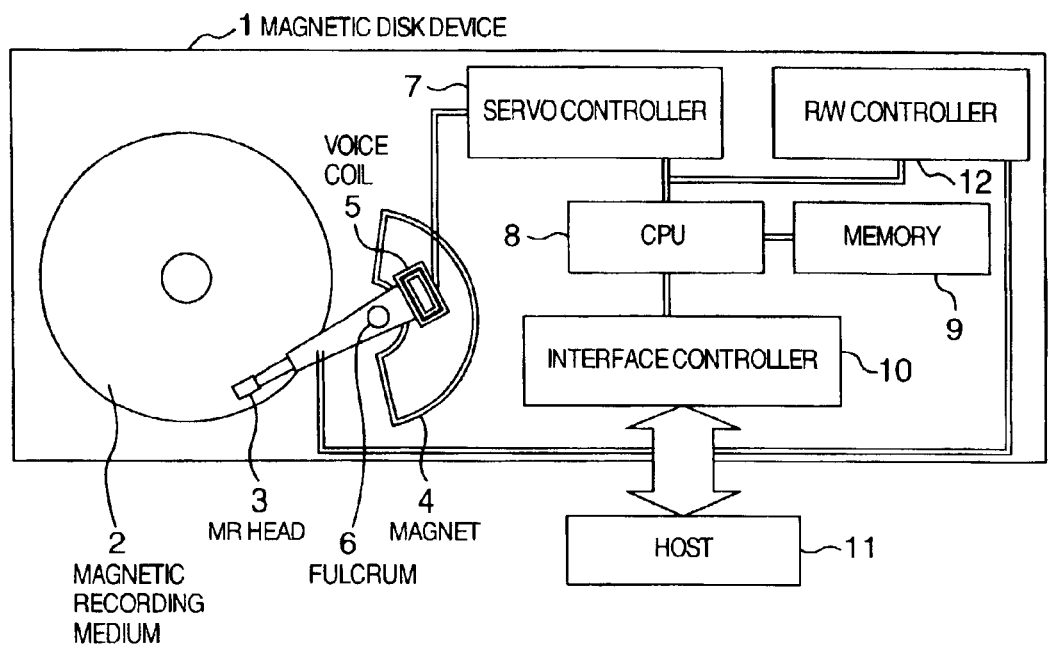
FIG. 1 is a diagram schematically showing a magnetic disk device.

Referring now to the drawings, description will be given of an embodiment of a magnetic disk device according to the present invention.

FIG. 1 schematically shows a magnetic disk device 1. The disk device 1 includes a magnetic recording medium 2 to record data thereon and a head of magneto-resistive (MR) type 3 to read data from the medium 2 and to record data thereon. When the magneto-resistive head 3 reproduces magnetic data recorded on the recording medium 2, a change in a leakage magnetic field of the medium is detected as a change of electric resistance (a voltage change) by supplying a detection current to a magneto-resistive-effect element (MR element).

The disk device 1 is connected to a host 11. An interface controller 10 receives data or an instruction from the host 11. Although not shown, a magneto-resistive head 3 is also disposed on a rear side of the recording medium to read data recorded on a rear surface of the recording medium 2 or to record data thereon. The disk device 1 may include a plurality of magnetic recording media 2.depending on cases.

A servo controller 7 controls a current flowing through a voice coil 5. By the current control, the head 3 is moved about a fulcrum 6 over the recording medium 2. The servo controller 7 performs seek control in this way. A read/write (R/W) controller 12 conducts read/write control. A CPU 8 controls the servo controller 7 and the read/write controller 12 according to instructions sent from the host 11 via the interface controller 10. Specifically, the CPU 8 drives the servo controller 7 to conduct a seek to move the head 3 to a position over a target track including a sector for a read/write operation. When the recording medium 2 rotates and the head 3 reaches the target sector, the CPU 8 controls the read/write controller 12 to conduct a read/write operation for the target sector using the head 3.

In this connection, "seek" basically indicates movement between tracks concentrically disposed on the recording medium 2. However, "seek" includes movement up to a target sector specified in the track depending on cases. "Magneto-resistive (MR) head 3" indicates a head in a wide sense. That is, "MR head 3" includes an MR element to read/record data and a slider unit to float the MR element over the recording medium.

Figure 2:
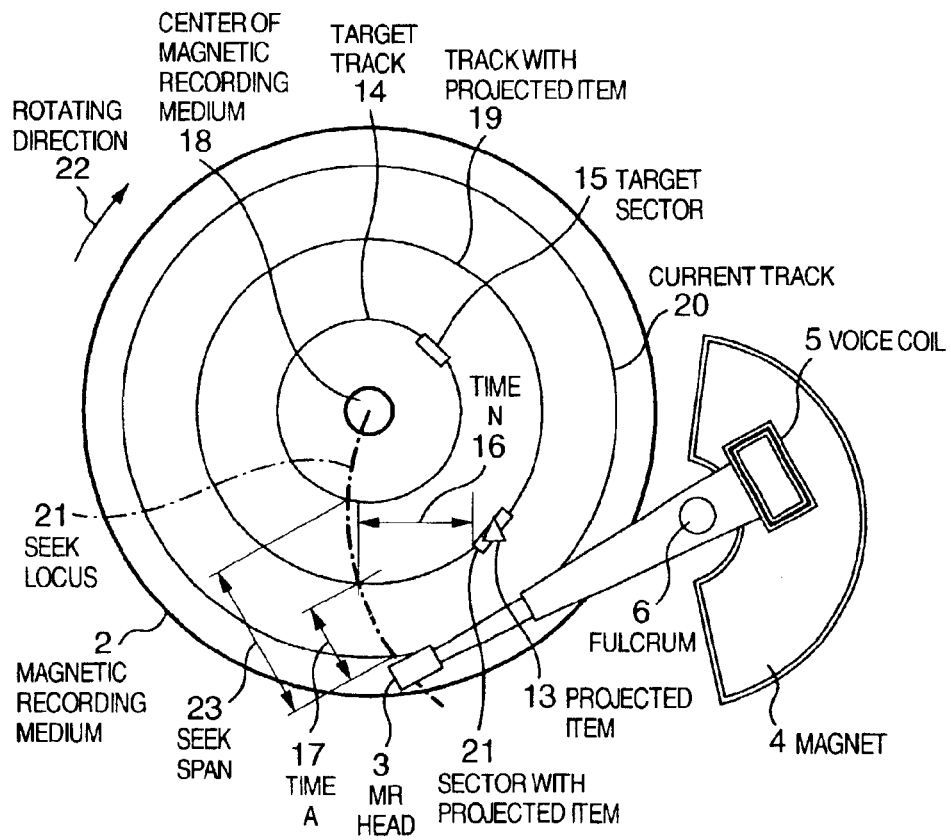
FIG. 2 is a diagram showing a magnetic recording medium, a projected item existing thereon, and a magneto-resistive head.

FIG. 2 shows a magnetic recording medium 2, a projected item 13 existing on the recording medium 2, and a magneto-resistive head 3.

First, a method of registering thermal asperity will be described.

A defect such as a projected item 13 not usable for recording and reproducing operations exists on the recording medium 2. If the defect is associated with composition of the medium 2, there does not exist any other adverse effect. Only the location cannot be used for the recording and reproducing operations. However, if the defect is a projected item 13, thermal asperity occurs as a result of contact between the head 3 and the projected item 13. The phenomenon can be confirmed by an output from the head 3. When the head 3 reads data from the recording medium 2, the CPU 8 recognizes the thermal asperity via the R/W controller 12 controlling the data. As a result of the thermal asperity, the sector of the thermal asperity cannot be used. Moreover, there arise associated problems in some cases. That is, the contact between the head 3 and the projected item 13 enlarges the thermal asperity to increase unusable sectors. The contact also damages the head 3.

Having detected thermal asperity, the CPU 8 registers to the memory 9 information of the thermal asperity as positional information, namely, a sector of the thermal asperity and a track including the sector. At detection of a defect other than thermal asperity, the CPU 8 similarly registers a sector of the defect and a track including the sector to the memory 9. The positional information registered to the memory 9 is also recorded on a nonvolatile memory, not shown, or the magnetic recording medium 2 to keep the positional information even if power of the disk device is turned on and off. When the disk device is powered again, the CPU 8 reads the positional information from the nonvolatile memory or the magnetic recording medium 2 and moves the information to the memory 9. It will be convenient if the positional information is stored together with bad sectors information.

Next, description will be given of a method of obtaining a period of time A 17 required to move from a cylinder of a track 19 with a projected item of which positional information is stored in the memory 9 to a cylinder of a current track 20.

The CPU 8 measures the seek time between the sectors by stepwise changing the seek start track and sector and the seek span. Specifically, the CPU 8 conducts a seek from a predetermined seek start position (a sector with a smallest sector number in a track with a smallest track number) to each target position according to a seek span as shown in Table 1. The CPU 8 stepwise changes the seek start position (sector) and similarly conducts the seek for each seek span. The CPU 8 then increases the seek start track number (an increase of one) and similarly conducts the seek for each seek span as shown in Table 2. The CPU 8 achieves the operation up to a state (max track: maximum number of tracks) of Table 4.

TABLE 1

| Seek span | Seek start position | Target position |
|---|---|---|
| 1 | Min Track, Min Sector | Mim Track + 1 |
| 2 | Min Track, Min Sector | Min Track + 2 |
| n | Min Track, Min Sector | . |
|  |  | Min Track + n |
|  |  | . |
| Max | Min Track, Min Sector | Max Track |
| 1 | Min Track, Min Sector + 1 | Min Track + 1 |
| 2 | Min Track, Min Sector + 1 | Min Track + 2 |
| n | Min Track, Min Sector + 1 | . |
|  |  | Min Track + n |
|  |  | . |
| Max | Min Track, Min Sector + 1 | Max Track |
| . | . | . |
| . | . | . |
| . | . | . |
| 1 | Min Track, Min Sector + m | Min Track + 1 |
| 2 | Min Track, Min Sector + m | Min Track + 2 |
| n | Min Track, Min Sector + m | . |
|  |  | Min Track + n |
|  |  | . |
| Max | Min Track, Min Sector + m | Max Track |
| . | . | . |
| . | . | . |
| . | . | . |
| 1 | Min Track, Max Sector | Min Track + 1 |
| 2 | Min Track, Max Sector | Min Track + 2 |
| n | Min Track, Max Sector | . |
|  |  | Min Track + n |
|  |  | . |
| Max | Min Track, Max Sector | Max Track |

TABLE 2

| Seek span | Seek start position | Target position |
|---|---|---|
| 1 | Min Track + 1, Min Sector | Min Track + 2 |
| 2 | Min Track + 1, Min Sector | Min Track + 3 |
| n | Min Track + 1, Min Sector | . |
|  |  | Min Track + 1 + n |
|  |  | . |
| Max-1 | Min Track + 1, Min Sector | Max Track |
| 1 | Min Track + 1, Min Sector + 1 | Min Track + 2 |
| 2 | Min Track + 1, Min Sector + 1 | Min Track + 3 |
| n | Min Track + 1, Min Sector + 1 | . |
|  |  | Min Track + 1 + n |
|  |  | . |
| Max-1 | Min Track + 1, Min Sector + 1 | Max Track |
| . | . | . |
| . | . | . |
| . | . | . |
| 1 | Min Track + 1, Min Sector + m | Min Track + 2 |
| 2 | Min Track + 1, Min Sector + m | Min Track + 3 |
| n | Min Track + 1, Min Sector + m | . |
|  |  | Min Track + 1 + n |
|  |  | . |
| Max-1 | Min Track + 1, Min Sector + m | Max Track |
| . | . | . |
| . | . | . |
| . | . | . |
| 1 | Min Track + 1, Max Sector | Min Track + 2 |
| 2 | Min Track + 1, Max Sector | Min Track + 3 |
| n | Min Track + 1, Max Sector | . |
|  |  | Min Track + 1 + n |
|  |  | . |
| Max-1 | Min Track + 1, Max Sector | Max Track |

TABLE 3

| Seek span | Seek start position | Target position |
| --- | --- | --- |
| 1 | Min Track + k, Min Sector | Min Track + k + 1 |
| 2 | Min Track + k, Min Sector | Min Track + k + 2 |
| n | Min Track + k, Min Sector | . |
|  |  | Min Track + k + n |
|  |  | . |
| Max-k | Min Track + k, Min Sector | Max Track |
| 1 | Min Track + k, Min Sector + 1 | Min Track + k + 1 |
| 2 | Min Track + k, Min Sector + 1 | Min Track + k + 2 |
| n | Min Track + k, Min Sector + 1 | . |
|  |  | Min Track + k + n |
|  |  | . |
| Max-k | Min Track + k, Min Sector + 1 | Max Track |
| . |  |  |
| . |  |  |
| . |  |  |
| 1 | Min Track + k, Min Sector + m | Min Track + k + 1 |
| 2 | Min Track + k, Min Sector + m | Min Track + k + 2 |
| n | Min Track + k, Min Sector + m | . |
|  |  | Min Track + k + n |
|  |  | . |
| Max-k | Min Track + k, Min Sector + m | Max Track |
| . |  |  |
| . |  |  |
| 1 | Min Track + k, Max Sector | Min Track + k + 1 |
| 2 | Min Track + k, Max Sector | Min Track + k + 2 |
| n | Min Track + k, Max Sector | . |
|  |  | Min Track +k +n |
|  |  | . |
| Max-k | Min Track + k, Max Sector | Max Track |

TABLE 4

| Seek span | Seek start position | Target position |
| --- | --- | --- |
| 1 | Max Track − 1, Min Sector | Max Track |
| 1 | Max Track − 1, Min Sector + 1 | Max Track |
| 1 | Max Track − 1, Min Sector + m | Max Track |
| . |  |  |
| . |  |  |
| 1 | Max Track − 1, Max Sector | Max Track |

The seek spans described above include seek spans (1, 2, . . . , maximum number of tracks) associated with respective seek start tracks, the seek spans covering the track 19 with a projected item registered to the memory 9. Having conducted the seek for each seek span covering the track 19 with a projected item, the CPU 8 calculates a point of time (time A 17 in FIG. 2) when the track 19 registered to the memory 9 is passed and then registers the time to the memory 9. The CPU 8 also registers to the memory 9 a seek start track (current track 20 in FIG. 2) and a seek span (seek span 23 in FIG. 2) when the track 19 with the projected item is covered by the seek span. The time (time A 17 in FIG. 2), the seek start track (current track 20 in FIG. 2), and the seek span (seek span 23 in FIG. 2) registered to the memory 9 are recorded on a nonvolatile memory or the magnetic recording medium 2 to keep these information items even if power of the disk device is turned on and off. When the disk device is powered again, the CPU 8 reads these information items from the nonvolatile memory or the magnetic recording medium 2 together with the positional information of the projected item and moves the information items to the memory 9.

As above, the track 19 with a projected item, the sector 21 with a projected item, the seek start track (current track 20 in FIG. 2), the time (time A 17 in FIG. 2) from the seek start track (current track 20 in FIG. 2) to track 19 with a projected item 13, and the seek span (seek span 23 in FIG. 2) are registered to the memory 9.

Figure 3:
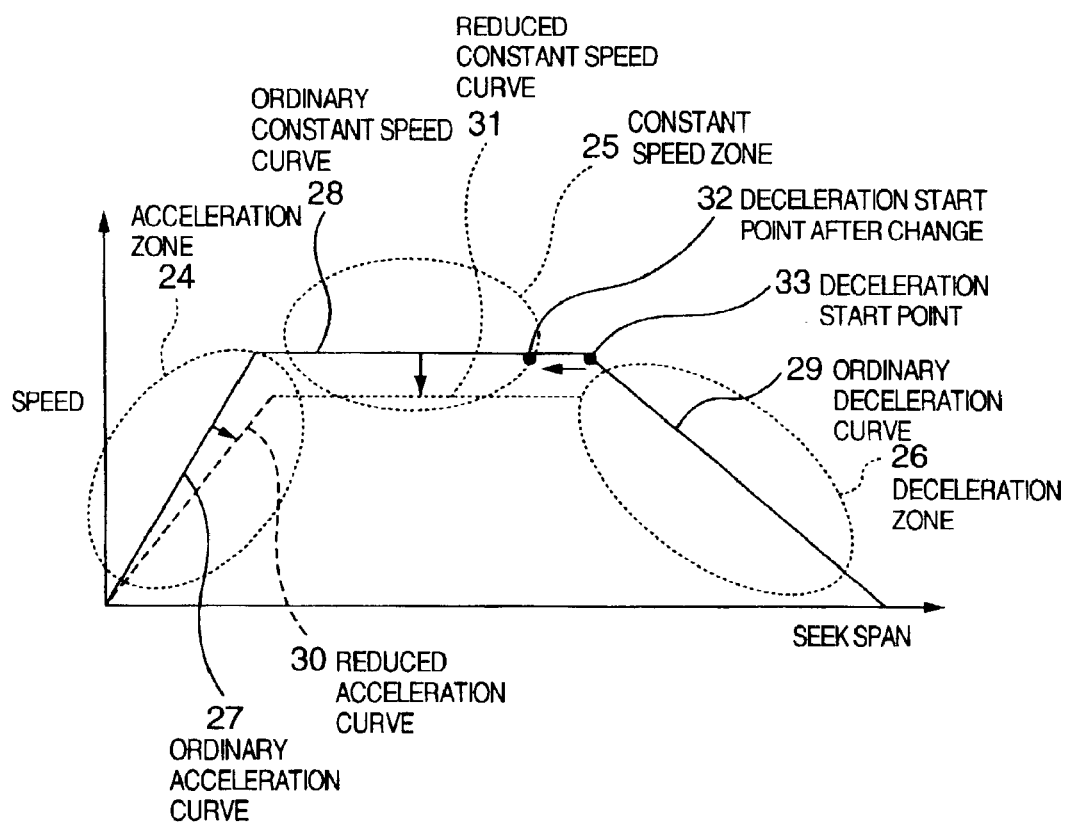
FIG. 3 is a graph showing an example of a speed table used in seek control.

FIG. 3 shows a speed table used for seek control.

In a seek operation, the CPU 8 conducts seek control for mainly three zones according to the speed table, namely, an acceleration zone 24, a constant speed zone 25, and a deceleration zone 26.

The speed table is disposed for each seek span. Like the positional information of the registered thermal asperity (projected item 13), the speed table is registered to a nonvolatile memory or the magnetic recording medium 2.

When the disk device is powered again, the CPU 8 reads the speed tables from the nonvolatile memory to place the tables in the memory 9. For each seek start track, the CPU 8 conducts seek control for each seek span (1, 2, . . . , maximum number of tracks) covering track 19 with a projected item registered to the memory 9.

During the seek control, the CPU 8 calculates a point of time (time A 17 in FIG. 2) when the track 19 with a projected item registered to the memory 9 is passed and one of the acceleration zone 24, the constant speed zone 25, and the deceleration zone 26 of the speed table used in the seek control and then registers the time and the zone to the memory 9. In the operation, the CPU 8 also registers the seek start track (current track 20 in FIG. 2) and the seek span (seek span 23 in FIG. 2) to the memory 9. The information items registered to the memory 9, namely, the point of time (time A 17 in FIG. 2), the zone selected from the acceleration zone 24, the constant speed zone 25, and the deceleration zone 26 of the speed table used in the seek control; the seek start track (current track 20 in FIG. 2), and the seek span (seek span 23 in FIG. 2) are recorded on a nonvolatile memory or the magnetic recording medium 2 to keep these information items even if power of the disk device is turned on and off. When the disk device is powered again, the CPU 8 reads these information items from the nonvolatile memory or the magnetic recording medium 2 and moves the information items to the memory 9.

In the data read/write operation, the CPU 8 of the magnetic disk device 1 determines a target track 14 including a target sector 15 in response to an instruction from the host 11. Description will now be given of a control method of the seek operation in which the MR head evades the projected item on the magnetic recording medium 2 during the seek operation in each embodiment.

First Embodiment

Figure 4:
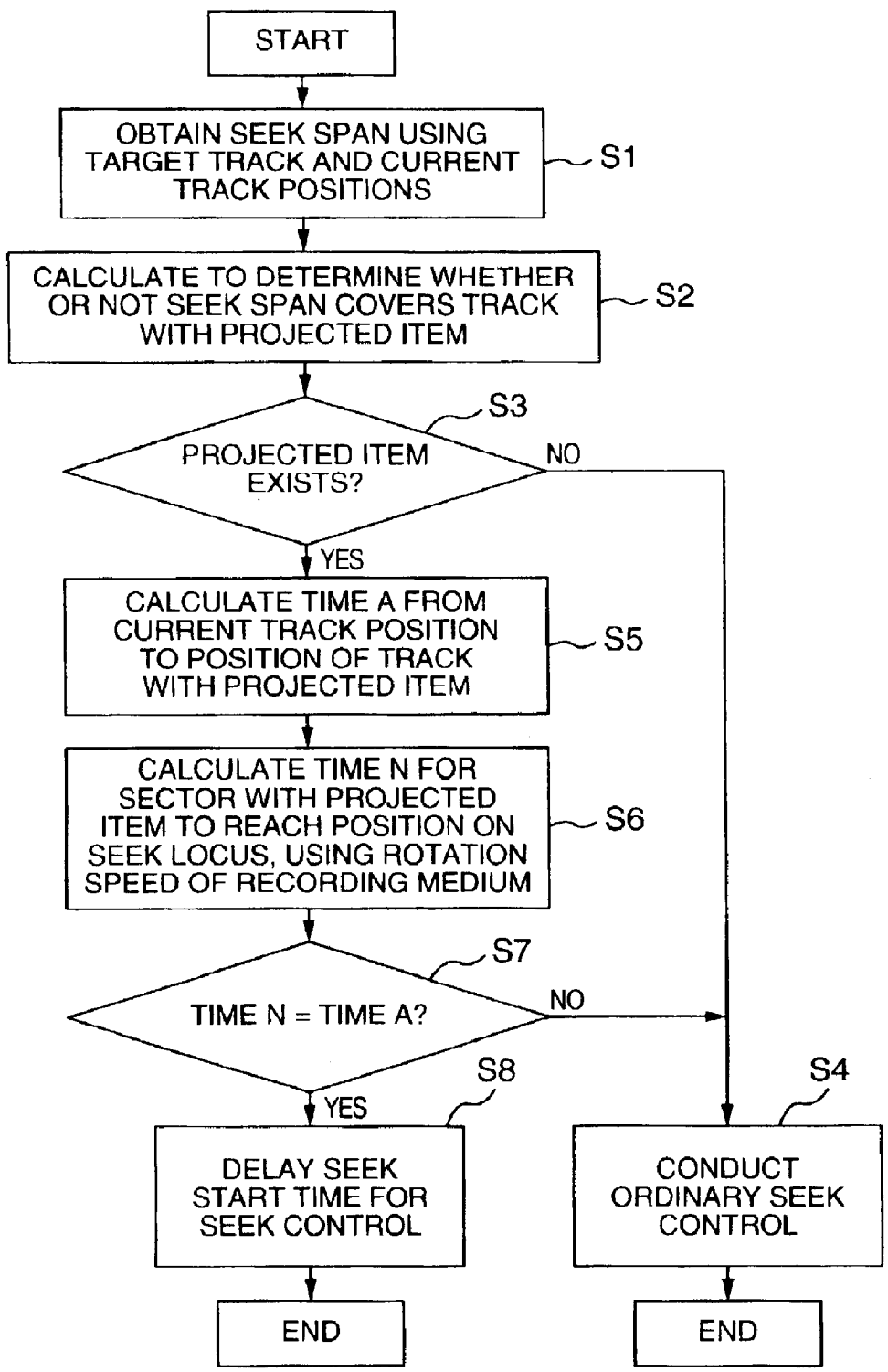
FIG. 4 is a flowchart showing a first embodiment.

Referring to FIG. 4, description will be given of a first embodiment of a magnetic disk device according to the present invention. FIG. 4 shows a flowchart of the first embodiment.

The CPU 8 calculates a seek span 23 using the target track 14 of the target sector 15 and the current track 20 (S1 indicates step 1 in FIG. 4). The CPU 8 calculates to determine whether or not a track 19 with a projected item registered to the memory exists in the current track 20 and the seek span 23 (step 2).

A check is made according to a result of the calculation to determine whether or not a track with a projected item exists (step 3). If a track 19 with a projected item does not exist, the CPU 8 conducts the ordinary seek control by the servo controller 7 (step 4). The ordinary seek control indicates a seek control operation beginning at an ordinary seek start time using an ordinary acceleration curve 27, an ordinary constant speed curve 28, and an ordinary deceleration curve 29.

At detection of the track 19 with a projected item, the CPU 8 calculates a period of time A 17 from the position of the current track 20 to that of the track 19 using the memory 9 (step 5). The CPU 8 then calculates, using the rotation speed of the recording medium 2, a period of time N 16 required for a sector 21 with a projected item registered to the memory 9 reaches a seek locus 21 (step 6). The CPU 8 calculates to determine whether or not the time A 17 is equal to the time N 16 (step 7). When these values are not equal, the CPU 8 conducts the ordinary seek control by the servo controller 7 (step 4).

When the values are equal to each other, the MR head 3 passes over the sector 21 with a projected item 13 during the seek. This means a high probability of contact between the head 3 and the projected item 13 existing between the head 3 and the recording medium 2. To avoid the contact between the head 3 and the projected item 13, the CPU 8 delays the seek start time. The CPU changes the time A 17 from the seek start point to the track 19 with the projected item and then conducts the ordinary seek control by the servo controller 7 (step 8).

Since the seek control is achieved by delaying the seek start time, the head 3 passes over the recording medium 2 with a locus different from the locus of the head 3 in the ordinary seek control operation. This resultantly avoids contact between the head 3 and the projected item 13.

Second Embodiment

Figure 5:
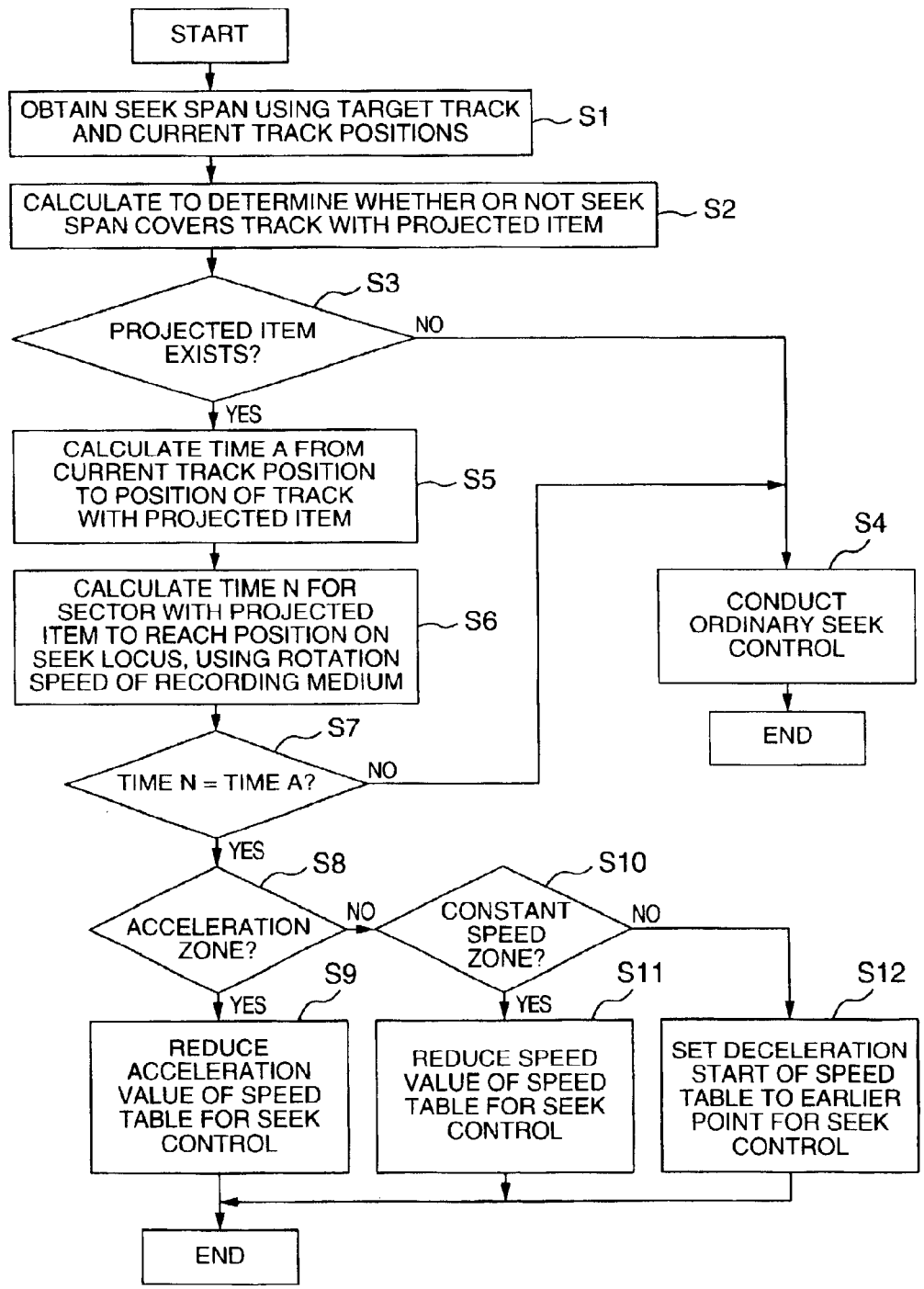
FIG. 5 is a flowchart showing a second embodiment.

Referring to FIG. 5, description will be given of a second embodiment of a magnetic disk device according to the present invention. FIG. 5 shows a flowchart of the second embodiment.

Steps 1 to 7 are the same as those of the first embodiment.

When the time A 17 is equal to the time N 16 in step 7, the CPU makes a check, to avoid contact between the head 3 and the projected item existing between the head 3 and the recording medium 2, to determine in which one of the acceleration zone 24, the constant-speed zone 25, and the deceleration zone 26 the projected item exists.

First, the CPU 8 makes a check to determine whether or not the time A 17 is equal to the time N 16 in the acceleration zone 24 (step 8). If these values are equal to each other, the CPU 8 reduces the acceleration value of the speed table to a reduced acceleration curve 30 (step 9). Otherwise, the CPU 8 makes a check to determine whether or not the time A 17 is equal to the time N 16 in the constant-speed zone 25 (step 10). If these values are equal to each other, the CPU 8 reduces the speed of the speed table to a reduced constant-speed curve 31 (step 11).

If the time A 17 is not equal to the time N 16 in the acceleration zone 24 and in the constant-speed zone 25, the CPU 8 assumes that these values are equal to each other in the deceleration zone 26. The CPU 8 conducts seek control using a speed table in which a deceleration start point 33 is changed to a deceleration start point 32 (step 12). When the deceleration start point 33 is changed, a point at which a quantity of sinking of the head 3 takes a maximum value corresponding to a maximum deceleration start time is also changed.

The CPU 8 adjusts the acceleration, constant-speed, and deceleration curves by controlling magnitude of a current to the voice coil 5 and a period of time to supply the current to the voice coil 5.

Since the seek control is achieved by changing the speed table, the head 3 passes over the recording medium 2 draws a locus different from the locus of the head 3 in the ordinary seek control operation. This consequently avoids contact between the head 3 and the projected item 13.

By using a plurality of seek control types and by changing the seek control method depending on a situation of presence or absence of a projected item 13 or a defect in a magnetic disk device according to the first or second embodiment, the seek time possibly varies depending on the seek start track and the start sector even for the same seek span in some cases as follows. When the CPU 8 recognizes that the sector 21 with the projected item is passed if the ordinary seek is conducted, seek start timing is changed in the first embodiment and the seek speed is changed in the second embodiment. As a result, the seek time is changed. On the other hand, when the control operation is not performed, the seek time becomes a fixed value regardless of the seek start track and the start sector if the seek span is the same.

In the second embodiment, when the acceleration value is changed to the reduced acceleration curve 30 in step 9, the CPU 8 conducts a delay control operation to wait for the constant-speed zone. Resultantly, the CPU 8 can move the head 3 to the target track 14 in the seek time equal to that used in the ordinary operation. Similarly, even when the projected item 13 exists in the constant speed zone or the deceleration zone, the seek can be conducted in the seek time equal to that used in the ordinary operation by controlling the speed also in other than the case in which the sector 21 with the projected item is passed.

As above, when the CPU 8 changes the speed table of the seek speed, a change of the seek speed for the seek (acceleration—constant-speed—deceleration) varies even for the same seek span between a seek in which a particular position such as the sector 21 with the projected item 13 is passed and an ordinary seek (in which a particular position such as the sector 21 with the projected item 13 is not passed).

Third Embodiment

Figure 7:
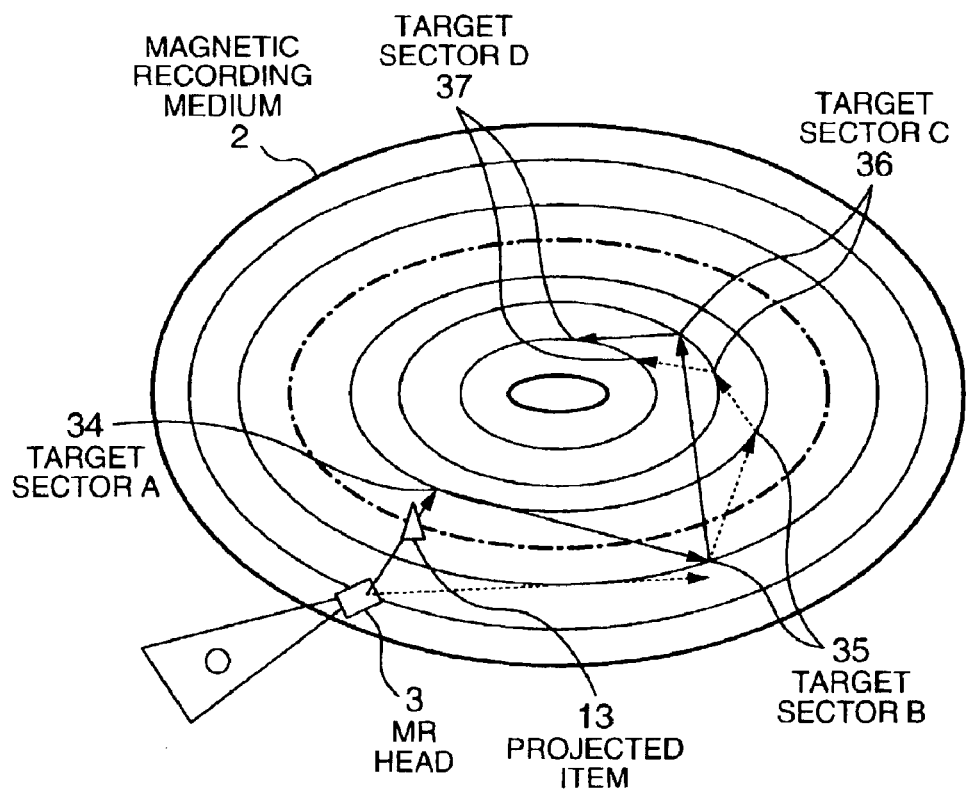
FIG. 7 is a diagram conceptually showing a seek locus.
Figure 8:
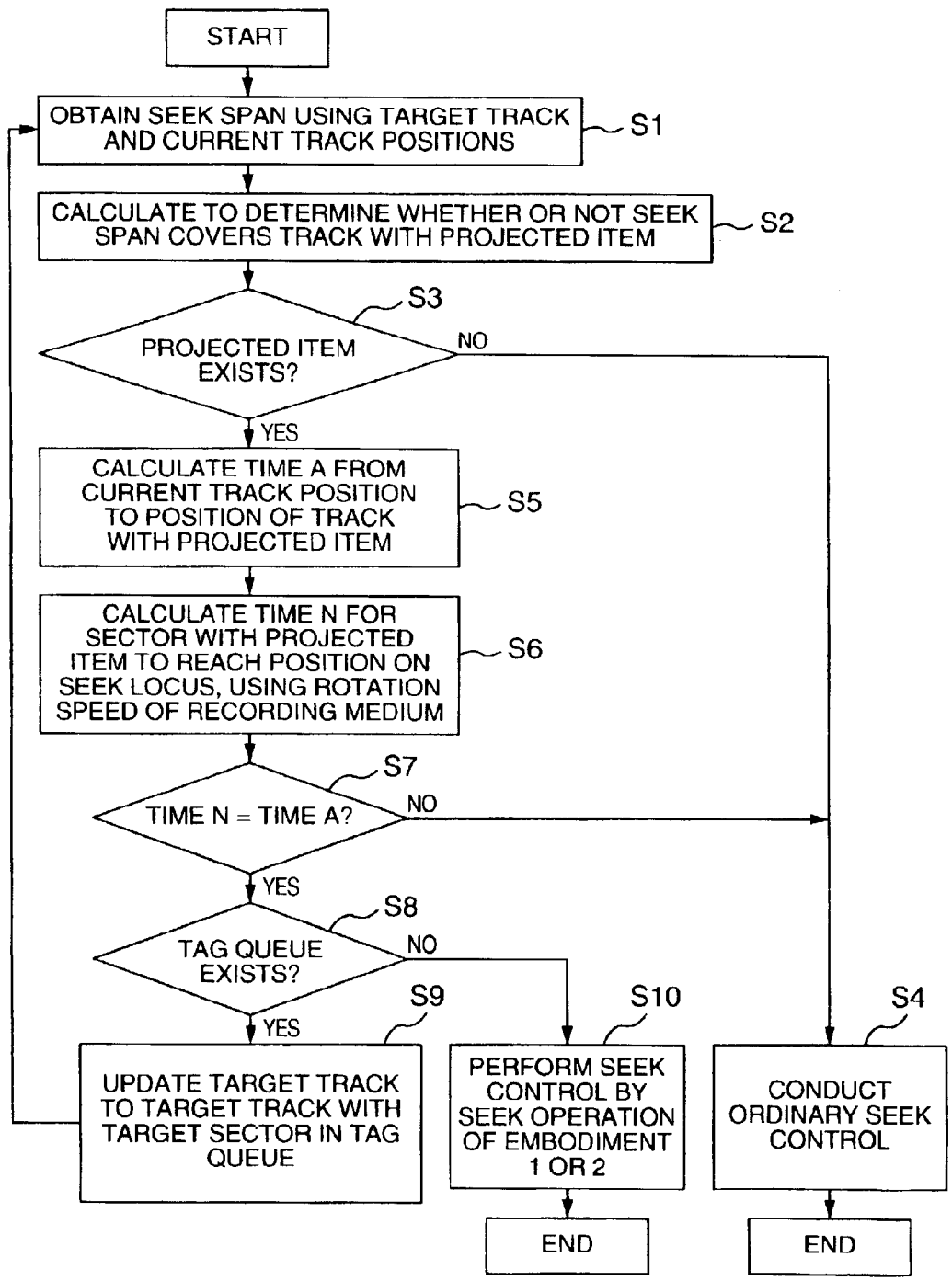
FIG. 8 is a flowchart showing a third embodiment.

A third embodiment will be described by referring to FIGS. 6 to 8. This embodiment is an embodiment applicable to a magnetic disk conducting a tag queuing operation. In the tag queuing operation, when a command (an instruction) requiring a plurality of seek operations is received from the host 11 as a higher-level system, the received sequence of the commands are changed so that the commands are processed in a shortest processing period of time.

Figure 6:
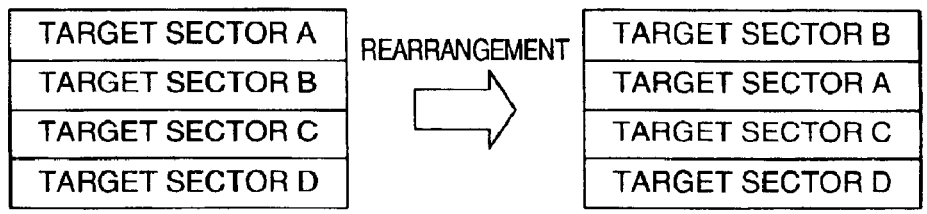
FIG. 6 is a diagram showing an example of rearrangement of tag queuing.

FIG. 6 shows commands (tag queuing or queue) from the host 11. In the current queue (on the left side), a target sector A 34, a target sector B 35, a target sector C 36, and a target sector D 37 are arranged for the seek operation in this order. FIG. 7 shows a conceptual diagram of a seek locus. FIG. 8 shows a flowchart of the third embodiment.

Steps 1 to 7 are executed in the same way as for the first or second embodiment. In this case, the first target sector is the target sector A 34.

When the time A 17 is equal to the time N 16 in step 7, the CPU 8 makes a search, to evade contact between the head 3 and a projected item 13 existing between the head 3 and the recording medium 2, to determine whether or not a command from the host 11 is in the queue (step 8).

If such a command exists in the tag queue, the CPU 8 should ordinarily conduct a seek operation for the target sector A 34. However, if the seek is conducted, the head 3 is brought into contact with the projected item 13. To avoid the contact between the head 3 and the projected item 13, the CPU 8 changes the tag queue.

First, the CPU 8 updates the target track to a track including the target sector B 35 for which a seek operation is to be conducted after the target sector A 34 (step 9). In the seek operation for the target sector B 35, the CPU 8 makes a check to determine whether or not a projected item 13 exists in a new seek locus. If the projected item 13 exists, the CPU 8 executes steps 1 to 7 to calculate, as in the case of the target sector A 34, whether or not the head 3 passes over a sector 21 with a projected item 13 in an ordinary seek operation. If the time A is not equal to the time N, the CPU 8 conducts the seek operation for the target sector B 35 before the target sector A 34. That is, as can be seen from the tag queue shown in FIG. 6, the CPU 8 rearranges the queue in the form on the right side to conduct the seek operation in an order of the target sector B 35, the target sector A 34, the target sector C 36, and the target sector D 37.

Even in the seek operation for the target sector B 35, if the time A is equal to the time N for the target sector B 35, the CPU 8 makes a check to determine whether or not another target sector for the seek operation exists (step 8). If such a target sector exists, the CPU 8 changes the target track to a track including the target sector C 36 (step 9). The CPU 8 similarly conducts the operation for the target sector C 36 (steps 1 to 7). If the time A is not equal to the time N, the CPU 8 rearranges the tag queue in an order of the target sector C 36, the target sector A 34, the target sector B 35, and the target sector D 37 to conduct the seek operation for the target sector C 36 before the target sector A 34 and the target sector B 35.

If the time A is equal to the time N for the target sector C 36, the CPU 8 makes a check to determine whether or not another target sector for the seek operation exists (step 8). The CPU 8 similarly conducts the operation for the target sector D 37. If the time A is not equal to the time N, the CPU 8 conducts the seek operation for the target sector D 37 before the target sector A 34, the target sector B 35, and the target sector C 36. If such a target sector is absent in step 8, it is indicated that the head 3 is brought into contact with the projected item 13 existing between the head 3 and the recording medium 2 in any queue arrangement.

In this situation, the CPU 8 performs the seek operation by evading the contact between the head 3 and the projected item 13 using the method of the first or second embodiment (step 10).

The recording medium 2 is rotating, and the time N continuously changes while the tag queue is being checked in step 8. Therefore, when the subsequent tag queue is absent, it is possible in some cases to avoid the contact between the head 3 and the projected item 13 by conducting the calculation again for the target sector queued in the previous or first tag queue. It is also possible depending on cases to avoid the contact by conducting the calculation again for the same target sector. This control operation is considered to be substantially equal to the control of the first embodiment in which the seek start time is delayed.

As above, the seek control operation can be achieved to avoid the contact between the head 3 and the projected item 13 existing between the head 3 and the recording medium 2.

According to the third embodiment, the tag queue may be rearranged not only by the rearrangement of the target sectors but also by changing the sequence of processing in consideration of the rotation of the recording medium 2. For example, when the target sector B 35, the target sector A 34, the target sector C 36, and the target sector D 37 are arranged in this order as shown in FIG. 6, the recording medium 2 must rotate at least twice to conduct the seek operation for all of the target sectors. By rearranging the tag queue in a sequence of the target sector B 35, the target sector C 36, and the target sector D 37, and the target sector A 34, the seek operation can be achieved for all target sectors while the recording medium 2 rotates once.

In the embodiments described above, the CPU 8 makes a check to determine whether or not the projected item 13 exists in a range up to the target track. However, without discriminating the projected item 13 from other defects, a similar control operation may be conducted according to presence or absence of a defect in a range up to the target track.

In the description of the embodiments, the magnetic disk device includes a magnetic disk with an arm of floating type. However, the present invention is applicable also to a magnetic disk with an arm moving in a straight direction as well as to any disk devices including a floating-type slider such as an optical disk device and a photomagnetic disk device.

According to the present invention, a plurality of kinds of seek operations including a particular seek operation are provided. When a projected item exists between a magneto-resistive head and a magnetic recording medium, a control operation is conducted to achieve the particular seek operation to evade the projected item. This resultantly prevents a seek error due to thermal asperity and hence the head is not damaged.

Occurrence of thermal asperity due to a new projected item produced by the contact between the head and the projected item can also be prevented.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk device comprising:

a medium for recording data;

a head for reading data recorded in a sector on the medium;

a central processing unit (CPU) for moving the head by a voice coil motor to a target sector; and a memory for registering a position of a sector that includes a defect;

wherein if the CPU estimates that the head passes over the sector including the defect upon executing a command requiring a seek operation, the CPU modifies a queue of commands in which each of the commands requiring the seek operation sent to the CPU from a higher-level device so as to execute an other command in the queue prior to the command requiring the seek operation in which the CPU estimates that the head passes over the sector including the defect.

2. A disk device according to claim 1, wherein if the CPU estimates that the head passes over the sector including the defect upon executing the command requiring the seek operation and the CPU can not execute the other command in the queue, the CPU performs the seek operation in a manner which is different from an ordinary way.

3. A disk device according to claim 2, wherein the CPU performs the seek operation in the manner which is different from an ordinary way by adjusting a magnitude and/or a period of time of a current supplied to the voice coil motor.

4. A disk device according to claim 2, wherein the CPU performs the seek operation in the manner which is different from an ordinary way by delaying a moving start time of the head.

5. A disk device according to claim 2, wherein the CPU performs the seek operation in the manner which is different from an ordinary way by changing a speed table for moving of the head.

6. A disk device comprising:

a medium for recording data;

a head for reading data recorded in a sector on the medium;

a central processing unit (CPU) for moving the head by a voice coil motor to a target sector; and a memory for registering a position of a sector that includes a defect;

wherein if the CPU estimates that the head passes over the sector including the defect during a seek operation for a velocity acceleration time-zone upon executing a command requiring the seek operation in which the CPU estimates that the head passes over the sector including the defect, the CPU executes the seek operation with an accelerated velocity which is different from an ordinary accelerated velocity.

7. The disk device according to claim 6, wherein if the CPU estimates that the head passes over the sector including the defect during a seek operation for a velocity constant time-zone upon executing the command requiring the seek operation, the CPU executes the seek operation with a seek velocity which is different from an ordinary velocity.

8. The disk device according to claim 7, wherein if the CPU estimates that the head passes over the sector including the defect during a seek operation for a velocity deceleration time-zone upon executing the command requiring the seek operation, the CPU controls the seek operation to start a velocity deceleration at a time which is different from an ordinary velocity deceleration start time.

9. The disk device according to claim 6, wherein if the CPU estimates that the head passes over the sector including the defect during a seek operation for a velocity deceleration time-zone upon executing the command requiring the seek operation, the CPU controls the seek operation to start a velocity deceleration at a time which is different from an ordinary velocity deceleration start time.

10. A disk device comprising:

a medium for recording data;

a head for reading data recorded in a sector on the medium;

a central processing unit (CPU) for moving the head by a voice coil motor to a target sector; and a memory for registering a position of a sector that includes a defect;

wherein if the CPU estimates that the head passes over the sector including the defect during a seek operation for a velocity constant time-zone upon executing a command requiring a seek operation in which the CPU estimates that the head passes over the sector including the defect, the CPU executes the seek operation with a seek velocity which is different from an ordinary velocity.

11. The disk device according to claim 10, wherein if the CPU estimates that the head passes over the sector including the defect during a seek operation for a velocity deceleration time-zone upon executing the command requiring the seek operation, the CPU controls the seek operation to start a velocity deceleration at a time which is different from an ordinary velocity deceleration start time.

12. A disk device comprising:

a medium for recording data;

a head for reading data recorded in a sector on the medium;

a central processing unit (CPU) for moving the head by a voice coil motor to a target sector; and a memory for registering a position of a sector that includes a defect;

wherein if the CPU estimates that the head passes over the sector including the defect during a seek operation for a velocity deceleration time-zone upon executing a command requiring the seek operation in which the CPU estimates that the head passes over the sector including the defect, the CPU controls the seek operation the start a velocity deceleration at a time which is different from an ordinary velocity deceleration start time.

* * * * *